United States Patent
Mallon et al.

(10) Patent No.: US 6,933,381 B2
(45) Date of Patent: Aug. 23, 2005

(54) METHOD OF PREPARING MODIFIED CELLULOSE ETHER

(76) Inventors: Charles B. Mallon, 290 Shelburne Pl., Belle Mead, NJ (US) 08502; John S. Vames, 10 Lawrence Ave., Highland Park, NJ (US) 08904; John I. Sarlis, 94 Jubinville, Laval, Quebec (CA), H7G 3E1; Benito See, 21 Mulford La., Belle Mead, NJ (US) 08502; David M. Trampe, 19 Crestmont Dr., Somerville, NJ (US) 08876; Rathin Datta, 442 W. Melrose St., Chicago, IL (US) 60657

( * ) Notice: Subject to any disclaimer, the term of this patent is extended or adjusted under 35 U.S.C. 154(b) by 583 days.

(21) Appl. No.: 09/775,760

(22) Filed: Feb. 2, 2001

(65) Prior Publication Data

US 2003/0013871 A1 Jan. 16, 2003

(51) Int. Cl.[7] .......................... C08B 11/00; C08B 11/12
(52) U.S. Cl. .......................... 536/124; 536/56; 536/84; 536/127; 536/123.1; 536/91; 536/30; 536/43; 536/90; 536/99; 536/44; 536/55.3; 536/120; 536/57; 424/488
(58) Field of Search .......................... 536/124, 56, 84, 536/127, 123.1, 91, 30, 43, 90, 99, 44, 55.3, 120, 57; 424/488

(56) References Cited

U.S. PATENT DOCUMENTS

| | | | |
|---|---|---|---|
| 3,835,006 A | * 9/1974 | Fujita et al. | 204/180 |
| 4,110,175 A | 8/1978 | Ahlgren et al. | 204/180 |
| 4,246,092 A | * 1/1981 | Perry et al. | 204/301 |
| 4,678,553 A | 7/1987 | Mandle et al. | 204/182.6 |
| 4,698,303 A | 10/1987 | Bailey et al. | 435/139 |
| 4,711,722 A | 12/1987 | Toyoshi et al. | 210/638 |
| 4,766,161 A | 8/1988 | Chlanda et al. | 521/27 |
| 4,802,965 A | 2/1989 | Puetter et al. | 204/182.4 |
| 4,885,247 A | 12/1989 | Datta | 435/139 |
| 5,143,834 A | 9/1992 | Glassner et al. | 435/145 |
| 5,294,316 A | 3/1994 | Schmidt et al. | 204/182.4 |
| 6,482,940 B1 | * 11/2002 | Klohr et al. | 536/84 |
| 2002/0016452 A1 | * 2/2002 | Obara et al. | 536/88 |
| 2002/0168407 A1 | * 11/2002 | Koch et al. | 424/480 |

FOREIGN PATENT DOCUMENTS

| | | |
|---|---|---|
| DE | 1668347 | 12/1967 |
| DE | 16 68 347 | * 9/1971 |
| FR | 2729305 | 1/1995 |
| JP | 61271296 | 12/1986 |
| JP | 1095101 | 4/1989 |
| JP | 1149801 | 6/1989 |
| JP | 01-149801 | * 6/1989 |
| JP | 3229621 | 10/1991 |

* cited by examiner

Primary Examiner—James O. Wilson
Assistant Examiner—Devesh Khare

(57) ABSTRACT

Process for the production of polysaccharide ethers, e.g. cellulose ethers, are disclosed wherein salts formed during the process, e.g., sodium nitrate or sodium acetate, are converted to their corresponding acids and bases by means of an electric current, preferably in combination with a bipolar membrane and suitable catiion and/or anion membranes. The acids and bases recovered from the process can be recycled, thereby avoiding the need to provide for disposal of salts.

17 Claims, 1 Drawing Sheet

METHOD OF PREPARING MODIFIED CELLULOSE ETHER

FIELD OF THE INVENTION

The present invention relates to processes for producing polysaccharide ethers. More specifically, the present invention relates to improved processes for producing polysaccharide ethers wherein salts formed in the processes can be converted to their corresponding acids and bases, e.g., by electrodialysis.

BACKGROUND OF THE INVENTION

Typical commercial processes for the manufacture of polysaccharide ethers, e.g. hydroxyethyl cellulose, require the use of acids and bases. For example, a base such as, e.g., sodium hydroxide, is typically used to promote the swelling of the polysaccharide, which in turn facilitates the subsequent reaction with an alkylene oxide, e.g., ethylene oxide. After the polysaccharide is reacted with the alkylene oxide to form the polysaccharide ether, the reaction mixture is typically neutralized with a mineral acid or an organic acid, e.g., nitric acid or acetic acid. As a result of the neutralization, a salt, e.g., sodium nitrate or sodium acetate, is formed. Typically, the salt is comprised in an aqueous waste stream which also contains organic solvents used in the process and residues of the polysaccharide.

Often, the salts are recovered from the waste stream and disposed of However, the disposal of such salts may not be environmentally desirable or feasible. Therefore, improved processes for the production of polysaccharide ethers are desired which can convert the salts formed in the processes to their corresponding acids and bases. Preferably, the acids and bases recovered from the processes can be recycled for use in the production of the polysaccharide ethers.

SUMMARY OF THE INVENTION

By the present invention, improved processes for the production of polysaccharide ethers, e.g., hydroxyethyl cellulose, are provided. The improvements are directed to the conversion of salts formed during the manufacture of the polysaccharide ethers to their corresponding acids and bases. In accordance with the present invention, the conversion of the salts to their corresponding acids and bases is achieved by subjecting the salts to an electric current effective to promote the conversion of the salts to the acids and bases. Preferably, a separation means, e.g., a bipolar membrane, is utilized to isolate the acids and bases as they are converted from the salt.

Prior to the conversion of the salts to their corresponding acids and bases, it is preferred in accordance with the present invention to remove organic solvents and residues of the polysaccharide from the salt-containing stream in order to avoid fouling of the bipolar membranes. Electrodialysis is a convenient means for removing such materials in accordance with the present invention because the salts are more strongly ionized than the other materials. However, these other materials, the residues of the polysaccharides in particular, can cause fouling of the membranes used in the electrodialysis process. Quite surprisingly, in accordance with the present invention, it has been found that by conducting the electrodialysis at a alkaline pH, the degree of fouling of the membrane can be reduced and the ionic mobility of the salt through the membrane can be enhanced.

DETAILED DESCRIPTION OF THE INVENTION

Figure 1:
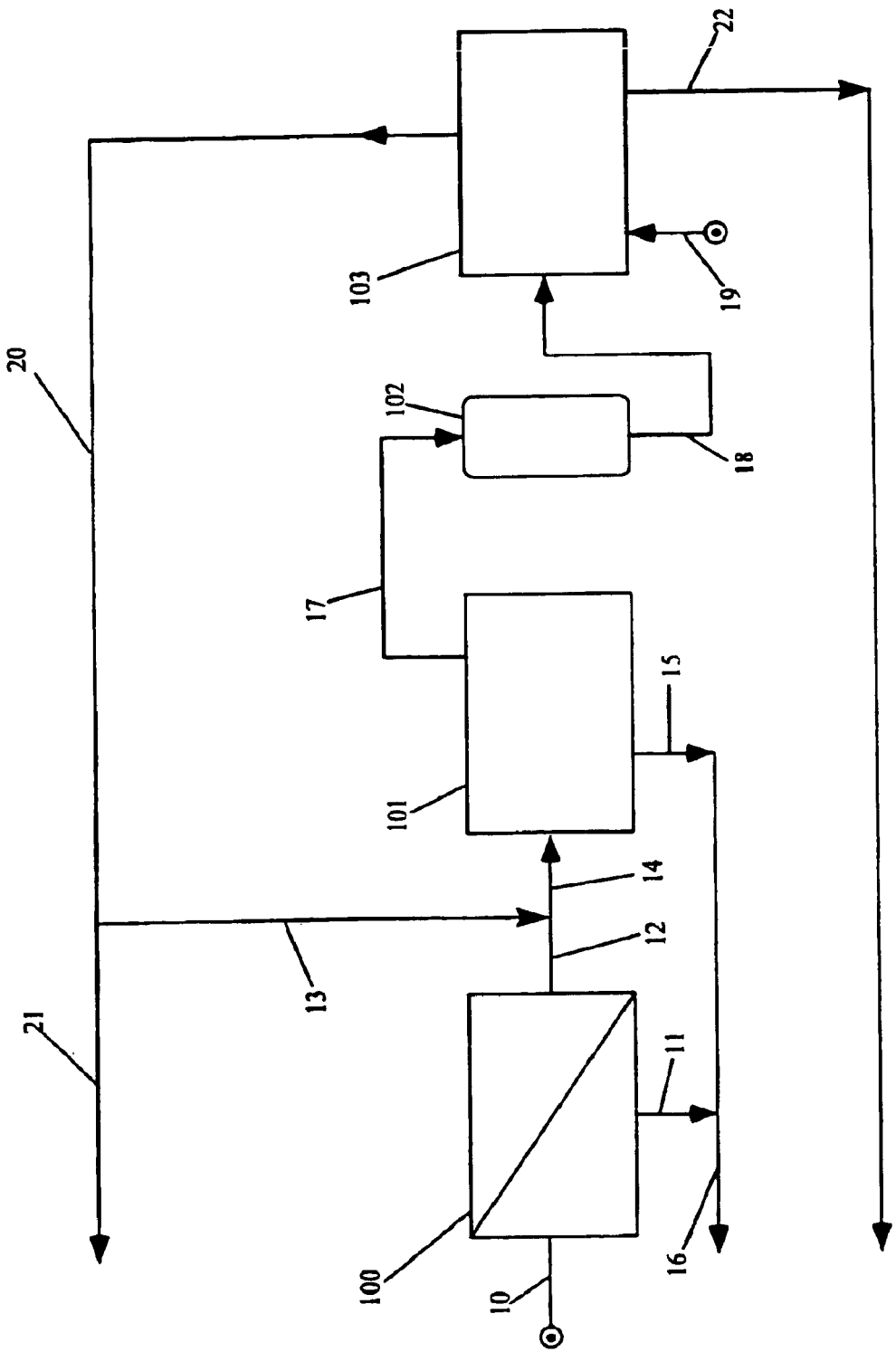
FIG. 1 is a schematic of a process for the conversion of a salt to its corresponding acid and base in accordance with the present invention.

The polysaccharide starting materials suitable for use in accordance with the present invention include naturally occurring, biosynthesized and derivatized carbohydrate polymers or mixtures thereof Such materials encompass high molecular weight polymers composed of monosaccharide units joined by glycosidic bonds. These materials may include, for example, the entire starch and cellulose families; pectin, chitosan; chitin; the seaweed products such as agar and carrageenan; alginate; the natural gums such as guar, arabic and tragacanth; bio-derived gums such as xanthan; and the like. Preferred starting materials include cellulosics conventionally employed for the preparation of cellulose ethers, such as, for example, chemical cotton, cotton linters, wood pulp, alkali cellulose and the like. Such materials are commercially available.

The molecular weight of the polysaccharides suitable for use in accordance with the present invention typically ranges from about 10,000 to 2,000,000 grams per gram mole and preferably ranges from about 20,000 to 250,000 grams per gram mole. As used herein, the term "molecular weight" means weight average molecular weight. Methods for determining weight average molecular weight of cellulose ethers are known to those skilled in the art. One preferred method for determining molecular weight is low angle laser light scattering.

The particular derivatizing agent, e.g., alkyl halides or alkylene oxides, used to derivatize the polysaccharides is not critical to the present invention. Suitable alkylene oxides for use in accordance with the present invention comprise from about 2 to 24, preferably from about 2 to 5 carbon atoms per molecule. Examples include ethylene oxide, propylene oxide and butylene oxide. Typically, the ether substituent is derivatized onto the cellulose by reacting the polysaccharide with an alkylene oxide, preferably ethylene oxide. The amount of ether substitution is typically from about 1.5 to 6 and preferably from about 2 to 4 moles of ether substituent per mole of polysaccharide ether. Suitable alkyl halides include, for example, ethyl chloride or methyl chloride.

The polysaccharide ethers may be substituted with one or more desired substituents, e.g., cationic, anionic and/or hydrophobic substituents. Hydrophobic substituents are known in the art and typically comprise alkyl, alkene, aryl-alkene or aryl-alkyl groups having about 8 to 24 carbon atoms per molecule. Hydrophobically-modified cellulose ethers are described, for.example, in U.S. Pat. Nos. 4,228,277, 5,120,328 and 5,504,123 and European Patent Publication 0 384 167 B1. Cationic, hydrophobically modified cellulose ethers are described, for example, in U.S. Pat. No. 4,663,159. The substitution level of each such substituent on the polysaccharide ether is typically from about 0.001 to 0.1 and preferably from about 0.004 to about 0.05 moles of substituent per mole of polysaccharide ether. More than one particular substituent can be substituted onto the polysaccharide ether.

The polysaccharide ethers of the present invention can be water-soluble or water-insoluble. As used herein, the term "water-soluble" means that at least 1 gram, and preferably at least 2 grams of the polysaccharide ether are soluble in 100 grams of distilled water at 25° C. and 1 atmosphere. The extent of water-solubility can be varied by adjusting the extent of ether substitution on the polysaccharide ether and by adjusting the substitution level of the various substituents, when present. Techniques for varying the water solubility of polysaccharide ethers are known to those skilled in the art.

The viscosity of the polysaccharide ethers typically ranges from about 1 to 8000 centipoise, preferably from about 100 to 3000 centipoise. Unless otherwise indicated, as used herein the term "viscosity" refers to the viscosity of a 1.0 weight percent aqueous solution of the polymer measured at 25° C. with a Brookfield viscometer. Such viscosity measuring techniques are known in the art and are described in ASTM D 2364-89. The average particle size of the polysaccharide ethers is not critical, but is preferably from about 0.01 to 1000 microns and more preferably from about 50 to 400 microns.

Preferred polysaccharide ethers produced in accordance with the present invention, are cellulose ethers, including for example, hydroxyethyl cellulose, hydroxypropyl cellulose, methyl cellulose, ethyl cellulose, hydroxypropyl methyl cellulose, hydroxyethyl methyl cellulose, carboxymethyl cellulose, hydroxyethyl carboxylmethyl cellulose, and derivatives thereof. example, nitric acid, acetic acid, hydrochloric acid, sulfuric acid, phosphoric acid and mixture thereof.

Typically, the liquid medium in which the etherification is conducted comprises from about 5 to 25 wt %, preferably from about 10 to 20 wt % water, from about 75 to 95 wt %, preferably from about 80 to 90 wt % of at least one organic solvent. The particular organic solvents used in the processes of the present invention, are not critical and may include, for example, t- butyl alcohol, acetone, isopropyl alcohol, ethanol, dioxane, glycol ethers and mixtures thereof Typically, the etherification of polysaccharides is conducted in a batch mode, although semi-batch and continuous processes may be employed. The process conditions typically include a reaction temperature of about 50 to 100° C., preferably from about 70 to 90° C., a pressure of from about 1 to 5 atmospheres, and the reaction time of from about 30 to 400 minutes. Further details concerning the etherification of cellulose are known in the art and disclosed, for example, in U.S. Pat. Nos. 2,010,818, 4,228,277 and 4,663,159.

Typical salts which are formed when the acidic compound is added to neutralize the reaction product include, for example, sodium nitrate, sodium acetate and other salts produced by combination of the acids and bases listed above. The concentration of the salts in the neutralized reaction product, i.e., the neutralized liquid, is typically from about 2 to 20 moles per kilogram of polysaccharide ether and preferably from about 5 to 10 moles per kilogram of polysaccharide ether.

In accordance with the improved processes of the present invention, the neutralized liquid, which comprises the salt, is subjected to an electric current and suitable means effective to promote the conversion of the salt to the acidic compound and the basic compound, e.g., a suitable separation means and a source of hydrogen ions and hydroxyl ions. Preferably, the step of subjecting the neutralized liquid to an electric current is conducted with a suitable separation means to isolate the acidic compound and the basic compound as they are converted from the salt. Any suitable means can be used to effect the isolation. A preferred separation means is by semi-permeable membranes, i.e., electrodialyis. Electrodialysis, sometimes referred to herein as "ED", is a well known separation process wherein ionized compounds are separated from non-ionized or weakly ionized compounds in aqueous solutions based on transport through ionic exchange membranes in an electric field. Details concerning suitable apparatus and process conditions for conducting electrodialysis are known to those skilled in the art.

Especially preferred membranes for use in accordance with the present invention to isolate the acids and bases from the salts are bipolar membranes. The use of bipolar membranes in conjunction with an electric current to perform a separation is referred to in the art as "water-splitting electrodialysis". Further details concerning suitable apparatus and process conditions for conducting water-splitting electrodialysis are known to those skilled in the art. See, for example, U.S. Pat. Nos. 4,885,247 and 5,143,839. The particular composition of the bipolar membranes is not critical. Examples of materials which comprise such membranes include cationic and anionic polymers, e.g., sulfonated polystyrene, polystyrene with amine functionality and polysulfone. Bipolar membranes are described for example, in U.S. Pat. Nos. 4,116,889 and 4,766,161. Preferred by commercially available bipolar membranes for use in accordance with the present invention, include the following: BP1 from Tokuyama Corporation Tokyo, Japan and AQPS and BA06 from Aqualytics Corporation, Warren, NJ. Other suitable bipolar membranes are commercially available.

Preferably, the electric current used to facilitate the conversion of the salt to its corresponding acid and base has a current density of from about 500 to 2000 amps/square meter ("A/sq. m.") and preferably from about 800 to 1200 amps per square meter. Current density is the current per unit area of available membrane through which the current passes measured when the current is initially applied to the membrane. The higher the applied current density, the lower the cell area required to achieve a specific degree of ion transfer.

Preferably, in accordance with the present invention, the neutralized liquid is subjected to a separation prior to the water-splitting electrodialysis to separate the salt from the organic solvents and any residue of the polysaccharide remaining from the etherification. Typically, distillation can be used to remove any volatile organics from the salt solution and to concentrate the salt to the appropriate concentration for further processing, typically about 5 to 20 wt %. Any suitable means can be used to effect the separation of the salt from the high boiling organic solvents and the residue of the polysaccharide, e.g. membrane separation, filtration, ultra-filtration, electrolysis, electrodialysis. Electrodialysis is a preferred means of separating the salts from the organic solvents and the residues of the polysaccharide. In this type of electrodialysis, known in the art as "desalting electrodialysis", the salt does not convert to its corresponding acid and base. It remains intact. Any semi-permeable membranes effective to promote the separation of the salts from the organic solvents and the residue of the polysaccharides can be used in accordance with the present invention. Typical membranes, for example, comprise films of crosslinked polymers comprising either positively or negatively charged groups. Examples include polystyrene divinylbenzene copolymers containing sulfonic acid groups (negatively charged, allowing transport of positive ions) or quaternary amine groups (positively charged, allowing transport of negative ions). Preferred commercially available semi-permeable membranes for the desalting electrodialysis step include, for example, cation membranes CM-2, CMX and CMB and anion membranes AM-1, AM-2 and AM-3 from Tokuyama Corporation. Other suitable membranes are commercially available. Further details concerning the apparatus and process for conducting desalting electrodialysis are known to those skilled in the art.

Quite surprisingly, in accordance with the present invention, it has been found that the efficiency of the salt recovery in the desalting electrodialysis step can be surprisingly enhanced by conducting the separation under alkaline conditions. Preferably, the alkaline conditions are effective to inhibit the deposition of the residue of the polysaccharide on the membrane. In addition, it is preferred that the alkaline conditions are effective to enhance the ionic mobility of the salt through the membrane. In a preferred aspect of the invention, the pH is greater than about 10, more preferably from about 10.5 to 14, even more preferably from about 10.5 to 13 and most preferably from about 10.5 to 11.5. At a pH below about 10, it has been found that significant fouling of the membranes can occur.

In addition to the specific unit operations described herein, those skilled in the art will recognize that additional unit operations, such as, for example, filtration, chelation, distillation, etc., can be used to enhance the overall process of the present invention.

The polysaccharide ethers of the present invention can have a variety of end-use applications, such as, for example, industrial applications and personal care applications. Typical industrial applications for polysaccharide ethers include, for example, use as viscosity adjusters, suspension aids, oil field drilling and fracturing materials, adhesion promoters for siliceous substrates, e.g., glass panels and ceramics, coating materials for plastic and metal substrates, protective colloids and building materials, e.g., wallboard compound and latex grout additive. Typical personal care applications include, for example, pharmaceutical and cosmetic compositions, e.g., ointments, skin creams, lotions, soaps, shampoos, conditioners and the like.

A preferred end-use application for polysaccharide ethers of the present invention, especially cellulose ethers such as hydroxyethyl cellulose and its derivatives, is as an additive in latex compositions.

Typical latex compositions comprise as essential components: water; latex polymer; and the cellulose ether. The kind and amount of latex polymer is not critical, and may be provided based on well established procedures. Typical latex polymers include, but are not limited to, various types such as the following: acrylics; alkyds; celluloses; coumarone-indenes; epoxys, esters; hydrocarbons; maleics; melamines; natural resins; oleo resins; phenolics; polyamides; polyesters; rosins; silicones; styrenes; terpenes; ureas; urethanes; vinyls; vinyl acrylics; and the like. Illustrative latex polymers include, but are not limited to, one or more homo- or copolymers containing one or more of the following monomers: (meth)acrylates; vinyl acetate; styrene; ethylene; vinyl chloride; butadiene; vinylidene chloride; vinyl versatate; vinyl propionate; t-butyl acrylate; acrylonitrile; neoprene; maleates; fumarates; and the like, including plasticized or other derivatives thereof.

The amount of cellulose ether which may be used in the latex composition is not narrowly critical. In the broadest sense, the amount of cellulose ether is that which is an effective amount in providing the desired thickening and rheological properties to the latex composition. Typically, the amount of cellulose ether is at least about 0.05, preferably from about 0.15 to about 3, and more preferably from about 0.25 to about 1.5 weight percent of the latex composition.

The selection and amount of latex polymer used in the latex composition can be determined by those skilled in the art is not critical. Typically, the amount of dry latex polymer is at least about 1, preferably from about 2 to about 50, and most preferably from about 3 to about 40 weight percent of the total latex composition.

The latex composition may optionally contain other components such as those generally used in latex compositions. Typical components include, but are not limited to, one or more of the following: solvents such as aliphatic or aromatic hydrocarbons, alcohols, esters, ketones, glycols, glycol ethers, nitroparaffins or the like; pigments; fillers, dryers, flatting agents; plasticizers; stabilizers; dispersants; surfactants; viscosifiers including other polymeric additives, cellulose ether based thickeners and so on; suspension agents; flow control agents; defoamers; anti-skinning agents; preseratives; extenders; filming aids; other crosslinkers; surface improvers; corrosion inhibitors; and other ingredients useful in latex compositions.

Further details concerning the preparation of latex compositions are known to those skilled in the art.

The invention is hereinafter described with reference to FIG. 1 which is provided for purposes of illustration and is not intended to limit the scope of the claims.

A hazy, dark brown feedstream 10 (neutralized liquid) containing about 8–10 wt % sodium acetate, about 0.5 wt % sodium hydroxide, about 4–5 wt % of a mixture of ethylene glycol, diethylene glycol and triethylene glycol, 1–2 wt % of partially soluble cellulosic material and the remainder water is passed to an ultrafiltration unit 100 wherein suspended materials and soluble materials with molecular weights above about 100,000 grams/gram mole are removed. Ultrafiltration unit 100 is comprised of a metal housing containing tubular membranes which are permeable to materials with molecular weights below 100,000 grams/gram mole. Examples of suitable membranes include ceramic membranes and polymeric membranes, e.g., polyamide, cellulose acetate, polyethersulfone, polyacrylonitrite, polyvinylidene fluoride and polyvinylchloride. A waste stream 11 comprising material which does not pass through the ultrafiltration unit is withdrawn by a stream 11. A clear brown filtrate stream 12 comprising essentially the same components as stream 10 but with the suspended matter and possibly some high molecular weight dissolved material removed is withdrawn from ultrafiltration unit 100, combined with sodium hydroxide via line 13, the source of which is hereinafter described, and introduced via line 14 to a desalting electrodialysis unit 101 which is comprised of a TS-2 ED stack from Tokuyama Corporation containing 6 ED cells comprised of AM1 anion exchange membranes and CM2 and CMX cation exchange membranes.

The desalting electrodialysis unit 101 is operated at a pH of from about 11 to 11.5. The amount of sodium hydroxide introduced via line 13 is controlled in order to provide the desired pH in the desalting electrodialysis unit 101. A stream 15 comprising material which does not pass through the membranes in the desalting electrodialysis unit 101 is combined with stream 11 as described previously and withdrawn from the process via line 16. A permeate stream 17 comprising about 18–20 wt % sodium acetate, about 1 wt % sodium hydroxide, about 0.5 wt % glycols and the remainder water is withdrawn from the desalting electrodialysis unit 101. The desalting electrodialysis unit 101 operates in a batch mode under the following conditions: a temperature of about 450° C., a feed flowrate (line 14) of about 3–4 liters/minute, an initial current density of about 500 A/sq. m., with a 3 wt % sodium sulfate electrode rinse solution.

Stream 17 is passed to a chelation unit 102 which is a 2-liter column with an internal diameter of 2 inches containing Duolite C-467 sodium form ion exchange resin available from Rohm and Haas, Philadelphia, PA. The purpose of the chelation unit is to reduce multivalent cation (Ca++, Mg++, Fe+++,etc.) concentrations to <1 ppmw. An effluent stream 18 is withdrawn from chelation unit 102 and passed to a water-splitting electrodialysis unit 103 which comprises a 2-compartment ED stack (TS-2, Tokuyama Corporation) equipped with cation exchange membrane CM-I and bipolar membrane BP1(4 cell pairs), both from Tokuyama Corporation. The water-splitting electrodialysis unit 103 operates in a batch mode under the following conditions: a temperature of about 45° C., a feed flowrate (line 18) of about 2–3 liters/minute, an initial current density of about 1000 A/sq. m., with a normal sodium hydroxide electrode rinse solution.

Water is introduced to the water-splitting electrodialysis unit 103 via line 19.

A base product stream 20 comprising from about 5 to 15 weight percent sodium hydroxide is produced. A portion of the sodium hydroxide product stream is recycled to the desalting electrodialysis unit 101 via line 13 as described previously. The remainder of the stream is withdrawn from the process via line 21.

An acid product stream 22 comprising from about 10 to 20 weight percent acetic acid, is also produced. This stream also contains some residual sodium acetate e.g., about 0.5 to 2 wt % and glycols present in the feed e.g., about 0.5 to 1 wt %.

Further details concerning the apparatus, process conditions and operation of the process described in FIG. 1 are known to those skilled in the art.

EXAMPLES

The following Examples are provided for illustrative purposes and are not intended to limit the scope of the claims which follow.

The following materials were used in the Examples.

| INGREDIENT | DESCRIPTION |
| --- | --- |
| Wood pulp | Improved Ethenier-F wood pulp sheets available from ITT Rayonier, Stamford, CT, and flocked in the laboratory by techniques known in the art. |
| Ethylene oxide: | Obtained from Praxair, Inc., Danbury, CT, distilled under nitrogen before use. |
| TS-2 ED Stack | Obtained from Tokuyama Corporation, Shibuya Konno Bldg., 3-chrome Shibuya, Shibuya-ku, Tokyo 150, Japan |
| Membranes AM-1, CM-2, CM-X, BP-1 | Obtained from Tokuyama Corporation, Shibuya Konno Bldg., 3-chrome Shibuya, Shibuya-ku, Tokyo 150, Japan |
| Duolite C-467 Ion Exchange Resin | A chelating resin comprised of a polystyrene divinylbenzene copolymer with aminophosphonic functional groups. Obtained from Rohm and Haas, Philadelphia, PA |
| B-1 Ultrafiltration module | PCI Membrane Systems Ltd., 123 South Division Street, Zelienople, PA |
| FP-100 Tubular UF Membranes | A polyvinylidene fluoride membrane available. PCI Membrane Systems Ltd., 123 South Division Street, Zelienople, PA |

EXAMPLE 1

Preparation of Hydroxyethyl Cellulose

A three pint, glass Chemco™ pressure reactor was charged with Improved Ethenier-F wood pulp (32.4 g contained), 317 g of acetone, 41 g of ethanol and 47 g of water. The mixture was stirred for one hour while purging the headspace of the reactor with nitrogen at a rate of 400 ml/min to remove any entrained oxygen. The reactor was fitted with an ice water condenser to prevent evaporative losses of the diluent during the nitrogen purge.

After purging for one hour the slurry was heated to 35° C. and held for 15 minutes. 47 g of 22 wt. % (by weight) aqueous sodium hydroxide solution were added to the slurry by syringe. The slurry was stirred for one hour at 35° C., while continuing the nitrogen headspace purge.

Ethylene oxide (34 g) was added to the reactor by syringe, and with continuous stirring, the reactor was sealed. The slurry was heated with a water bath to 75° C. (typical heat-up time is 60 minutes). The temperature was held at 75° C. for 1.5 hours to react out the ethylene oxide.

The slurry was cooled to room temperature and 16.2 g of glacial acetic acid were added by syringe. After stirring for 15 minutes, the polymer was collected by vacuum filtration through a fritted metal Buchner funnel. The polymer was washed four times with 500 ml of 7:1 (by volume) acetone/water, twice with 500 ml of 5:1 acetone/water, and twice with 500 ml of pure acetone. In the second pure acetone wash, 1.00 g of 40% aqueous glyoxal and 2.00 g of glacial acetic acid was included in the acetone wash to surface-treat the polymer. The polymer was dried overnight in vacuo at 50° C., affording 50–55 g of a white granular solid.

The ash content was found to be 4–8% (as sodium acetate), and the mass gain EO MS was found to be 2–2.5.

CONTROL EXAMPLE 2

A stream containing about 8 wt % sodium acetate, 0.5 wt % sodium hydroxide, 4 wt % glycols, and 0.5 wt % cellulosic material (the remainder water), recovered by distillation of organics and some water from a combined diluent/wash solution from the process described above, was processed in a TS-2 ED stack containing 6 cell pairs made up of AM-1, CM-2, and CMX membranes. This stream was dark brown in color but clear to the naked eye. It had previously been ultrafiltered using an apparatus consisting of a feed tank and pump connected to a membrane module with a B-1 housing and 18 FP-100 tubular membranes (PCI Membranes, 100,000 molecular weight cutoff) to remove suspended and high molecular weight components. Initial current density was 500A/sq.m.The run proceeded normally until the pH of the feed stream dropped from the initial value of 11.5 to about 10.5. At this point only about 77 wt % of the acetate had been transferred and cell resistance was increasing. Therefore the run was ended.

EXAMPLE 3

A stream identical to the one used in Control Example 2 was processed as described above except that the pH of the feed was raised to ~11.5 by addition of 40 wt % sodium hydroxide whenever the pH dropped to ~11. As a result of this pH control, ~91 wt % of the acetate was transferred and cell resistance was kept under control. Sodium acetate concentration in the concentrate was about 20 wt % by weight.

The product from the ED step was then processed through a column containing Duolite C-467 to remove multivalent cations. Ca++ and Mg++ were below 1 ppm in the resulting stream. This product stream was then subjected to water splitting electrodialysis using a 2-compartment TS-2 stack equipped with BP1, CM-1, and CMX ion exchange membranes. The stream processed with no difficulty and produced an acid/salt product containing about 16 wt % acetic acid and a sodium hydroxide product with a concentration of about 10 wt %. There was no evidence of irreversible membrane fouling and cell voltage remained low (~1.2 volts/cell pair) throughout the run.

EXAMPLE 4

A stream from the distillation of the diluent and wash solutions from example 1 containing about 12 wt % sodium acetate was ultrafiltered and passed through a chelation column as described in example 3. The resulting solution was processed using the water splitting electrodialysis process described in example 3. Cell voltage was about 1.5 volts/cell pair within a half hour. After 6–8 hours of operation the system began to plug up, pressure increased and cell voltage increased to over 2 volts/cell pair (constant current operating mode) . An oily, tarry material was seen floating on the top of the feed tank. The base was brown in color. The entire system, including tanks and pipes, had to be cleaned after this test Although the invention has been described with respect to specific aspects, those skilled in the art will recognize that other aspects are intended to be included within the scope of the claims which follow.

What is claimed is:

1. In a process for producing polysaccharide ethers comprising:
    (i) treating polysaccharide with a basic compound to promote swelling of the polysaccharide;
    (ii) reacting the polysaccharide with at least one derivatizing agent in a liquid medium comprising at least one organic solvent under conditions effective to promote a reaction between the polysacchaide and the derivatizing agent and form a reaction product comprising a polysaccharide ether, the basic compound and the organic solvent and a residue of the polysaccharide;
    (iii) treating at least a portion of the reaction product comprising the basic compound with an acidic compound to provide a neutralized liquid comprising a salt of the acidic compound and the basic compound; and
    (iv) separating the polysaccharide ether from at least one of the reaction product or the neutrailzed liquid:

The improvement which comprises:
    (a) subjecting the neutralized liquid to a first separation at an alkaline pH to separate the salt from the organic solvent and the residue of the polysaccharide and provide a purified, neutralized liquid; and
    (b) subjecting the purified, neutralized liquid to an electric current and a separation means effective to promote the conversion of the salt to the acidic compound and the basic compound.

2. The process of claim 1 which provides an acid product stream comprising the acidic compound.

3. The process of claim 1 which provides a base product stream comprising the basic compound.

4. The process of claim 1 wherein said subjecting of the purified, neutralized liquid with the electric current is conducted in the presence of a bipolar membrane effective to provide a source of hydrogen and hydroxyl ions.

5. The process of claim 1 wherein the first separation is conducted by electrodialysis with a semi-permeable membrane.

6. The process of claim 5 wherein the pH is effective to inhibit the deposition of the residual of the polysaccharide on the membrane.

7. The process of claim 6 wherein the pH is greater than about 10.

8. The process of claim 7 wherein the pH is from 10.5 to 14.

9. The process of claim 7 wherein the electric current has a current density of from 500 to 2000 amps per square meter.

10. The process of claim 1 wherein the organic solvent is selected from the group consisting of acetone, ethanol, isopropyl alcohol, t-butyl alcohol, mono-, di, and triethylene glycol and mixtures thereof.

11. The process of claim 1 wherein the basic compound is selected from the group consisting of sodium hydroxide, potassium hydroxide, calcium hydroxide, magnesium hydroxide, lithium hydroxide, ammonium hydroxide and mixtures thereof.

12. The process of claim 1 wherein the acidic compound is selected from the group consisting of acetic acid, nitric acid, hydrochloric acid, sulfuric acid, phosphoric acid and mixtures thereof.

13. The process of claim 1 wherein the polysaccharide is selected from the group consisting of cellulose, starch, pectin, chitosan, chitin, agar, carrageean, alginate, guar, arabic, tragacanth, xanthan gum and mixtures thereof.

14. The process of claim 1 wherein the derivatizing agent is an alkylene oxide and selected from the group consisting of ethylene oxide, propylene oxide, butylene oxide and mixtures thereof.

15. The process of claim 1 which further comprises derivatizing the polysaccharide ether with at least one cationic, anionic or hydrophobic substituent.

16. A process for producing cellulose ethers comprising:
    (i) treating cellulose with a basic compound to promote swelling of the cellulose;
    (ii) reacting the cellulose with at least one derivatizing agent in a liquid medium comprising at least one organic solvent under conditions effective to promote a reaction between the cellulose and the derivatizing agent and form a reaction product comprising a cellulose ether, the basic compound and the organic solvent and a residue of the cellulose;
    (iii) treating at least portion of the reaction product comprising the basic compound with an acidic compound to provide a neutralized liquid comprising a salt of the acidic compouind and the basic compound; and
    (iv) separating the cellulose ether from at least one of the reaction product or neutralized liquid:

The improvement which comprises:
    (a) subjecting the neutralized liquid to a first separation by electrodialysis with a semi-permeable membrane at an alkaline pH to separate the salt from the organic solvent and the residue of the cellulose and provide a purified, neutralized liquid; and
    (b) subjecting the purified, neutrlied liquid to an electric current and a separation means effective to promote the conversion of the salt to the acid compound and the basic compound.

17. The process of claim 16 wherein the pH is effective to inhibit the deposition of the residue of the cellulose on the membrane.

* * * * *